Feb. 27, 1951  H. A. SHABAKER  2,543,132
CATALYST MANUFACTURE AND APPARATUS THEREFOR
Filed March 8, 1945  5 Sheets-Sheet 1

INVENTOR
H. A. SHABAKER
BY *William C. Blackburn*
ATTORNEY

Patented Feb. 27, 1951

2,543,132

UNITED STATES PATENT OFFICE 2,543,132

CATALYST MANUFACTURE AND APPARATUS THEREFOR

Hubert A. Shabaker, Media, Pa., assignor to Houdry Process Corporation, Wilmington, Del., a corporation of Delaware Application March 8, 1945, Serial No. 581,682

12 Claims. (Cl. 252—448)

1

The present invention relates to new and improved methods and apparatus for catalyst manufacture.

Two general types of catalysts in the past have been described in the literature and have been employed. One type is the powdered catalyst which is generally used in suspension. Processes using such a catalyst suspended in reactant vapors were described and tried at an early time in the development of the catalytic field, and have recently been reinvestigated and employed on commercial scale. The other type of catalyst is in the form of pills or pellets, in which each pellet is an aggregate of fine powder. Such catalysts are employed both for static and moving bed operations. Either of the above types of catalysts may be a naturally occurring material such as lime, fuller's earth, an active or activated clay or the like, either alone or with deposited catalytic or promoter material carried thereby. Likewise either type may be a synthetic gel or gelatinous precipitate, of composition catalytically active in the process to be conducted.

A recently developed distinct type is the so-called "bead" catalyst, in which the individual beads are glass-like pieces of gel. Such catalysts are desirable due to the modified rate of penetration of gas, including vapors, into and out of the individual pieces, resulting in modified catalytic properties due to physical properties considerably different from aggregate catalysts. This type of catalyst is entirely different physically from the aggregate catalyst since the structure of the gel as it sets is maintained through the finishing operations of purifying and drying.

The present invention is particularly directed to the production of "bead" type catalyst. In accordance herewith, catalysts of this type are produced by suspending drops of aqueous liquid by a water immiscible liquid for a sufficient time that the drops set. The aqueous liquid is such as will set to a gel including all the components of the liquid if given sufficient time or if setting is accelerated as by heating or change of pH. The aqueous liquid in addition to being a solution or sol, may additionally include insoluble materials, such as an initially produced gelatinous precipitate or a finely divided insoluble powder of any desired composition. After setting, the beads of hydrogel are separated from the water immiscible liquid, and then finished for use.

One of the problems in the manufacture of "bead" type catalyst is the maintenance of substantially uniform size. If there is any substantial variation in the size of the drops as formed, the larger drops rise or fall through the suspending liquid at a greater rate than the smaller drops. Accordingly, the larger drops coalesce with other drops, resulting in an extremely large variation in size.

Objects of the present invention are to provide improved methods and apparatus for the production of catalyst of the stated type; to provide methods and apparatus for forming drops of equal size of one liquid in a liquid immiscible therewith; and to provide methods and apparatus for the removal of small gel pieces from a body of liquid in which the gel pieces are formed.

In accordance with a specific, preferred form of the present invention a predetermined quantity of a liquid which will set to a gel under the conditions of operation is introduced into an inclined groove partially submerged in a body of liquid immiscible therewith. The gel forming liquid, being introduced into the groove at a level above the level of the body of liquid, runs down the groove and comes to rest at the surface of the body of liquid. The gel forming liquid is allowed to remain in the groove for a time sufficient to allow it to coalesce as a drop. Before the drop sets to a gel some of a liquid which is immiscible with the gel forming liquid is introduced above the drop into the groove, whereby the drop is moved out of the groove into the body of liquid. By having a plurality of grooves positioned about the periphery of a disk and by mounting a delivery nozzle for rotation at a constant rate over the grooves, the amount of liquid introduced into each groove may be accurately predetermined and equal.

The drops of liquid may either float upon or descend through the body of liquid, while setting to gel. When the drops descend through the body of liquid into the lower portion of the body, the drops are there entrained by a stream of the liquid which stream carries them out of the body of the liquid through an upwardly rising column of the liquid to a fixed overflow from the column. The mixture of gel pieces and liquid is separated and the liquid returned to the bottom of the body of liquid. The drops alternatively may set to gel pieces while floating on the body of liquid and be entrained by a stream of liquid which conveys the drops to an overflow. The drops set to gel before discharge to the overflow. From the overflow the mixture of gel pieces and liquid is separated, the separated liquid being returned to the body of liquid. This method which involves floating the drops of gel forming liquid on a liquid immiscible therewith produces improved bead type catalysts in which the gel pieces are of oblate spheroidal form.

Preferred apparatus in accordance with the present invention and for carrying out the process of this invention is disclosed in the accompanying drawings in which:

Fig. 6 is a section on the line VI—VI of Fig. 2;

Figure 1:
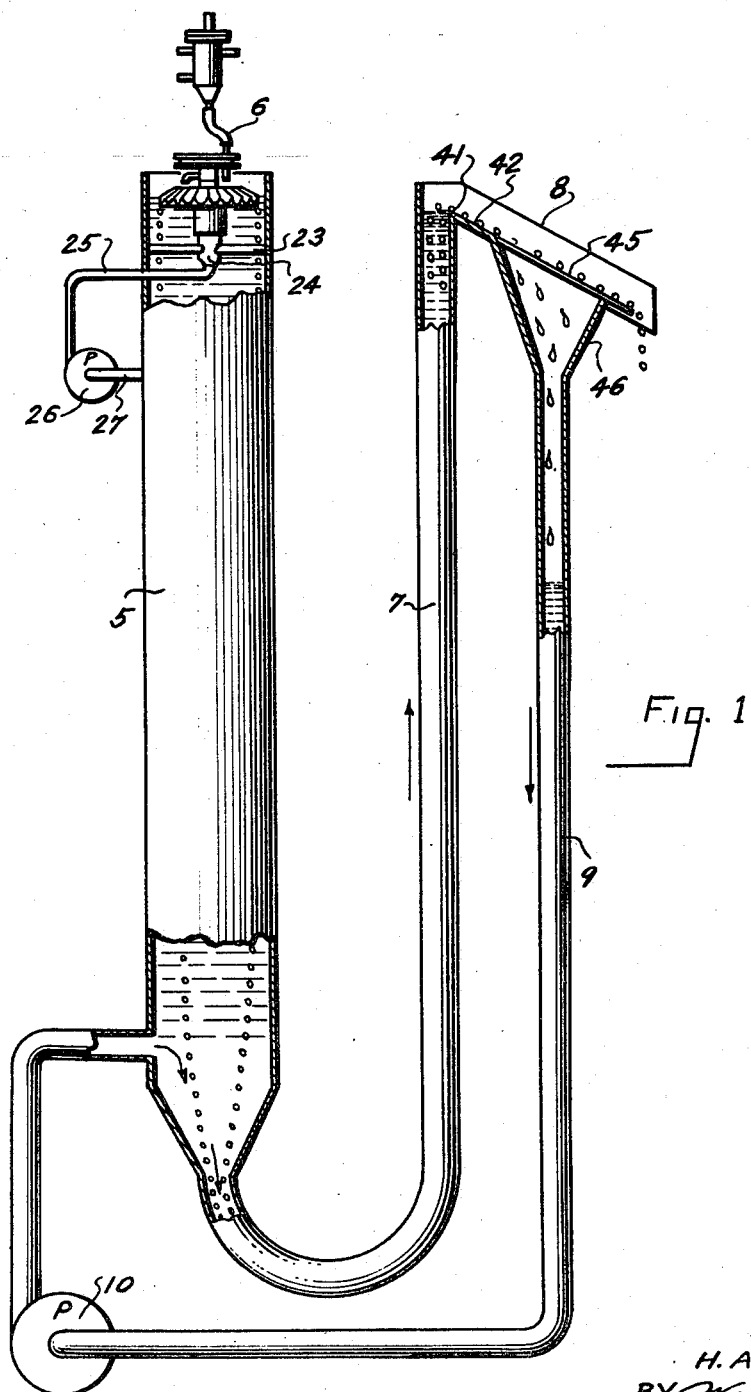
Fig. 1 is an elevation of a preferred form of apparatus in which the drops of liquid descend through the suspending liquid, parts being broken away to show internal construction.
Figure 5:
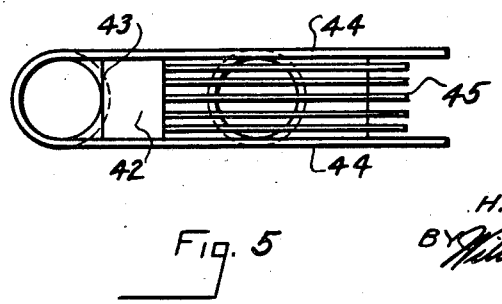
Fig. 5 is a plan of the separator shown in the upper right-hand portion of Fig. 1.

The form of the invention shown in Fig. 1 involves a column 5 containing a suspending liquid. The column 5 has at its upper end a device 6 for forming drops of liquid in the suspending liquid. A balancing leg 7 balances the liquid in the column 5. The column 7 has at its upper end a separator 8 shown more particularly in Fig. 5 for separating hydrogel beads from the liquid. A liquid return pipe 9, provided with a pump 10, receives liquid from the separator 8 and introduces the liquid into the lower end of the column 5.

The liquid in the columns 5 and 7 and in the return pipe 9 is a liquid immiscible with the liquid of which drops are formed. Further, the specific gravity of the liquid in the system is less than the specific gravity of the drop forming liquid. Therefore, the drops will move downwardly through the suspending liquid in the column 5. When the drops descend to the bottom of the column 5 they are entrained by a stream of liquid which moves upwardly in the column 7. At the upper end of the column 7 the liquid, with the hydrogel pieces carried thereby, overflows from column 7 into separator 8, and the liquid returns by the pipe 9 through the pump 10 to the lower portion of the column 5. It is to be noted that the liquid levels in columns 5 and 7 are different. When the liquid is not flowing through the column 7, the levels are the same. When flow is initiated by starting the pump 10, the level in column 5 increases to balance the additional force resulting from resistance to flow through the column 7. By variation of the rate of flow through column 7, it is possible to control accurately the level in column 5.

The liquid used in columns 5 and 7 may be the same, though if desired two immiscible liquids may be employed, the liquid in column 5 being of lower specific gravity than that employed in the entraining stream including column 7. An example of such a pair of liquids, suitable for use here, is oil and water.

Figure 2:
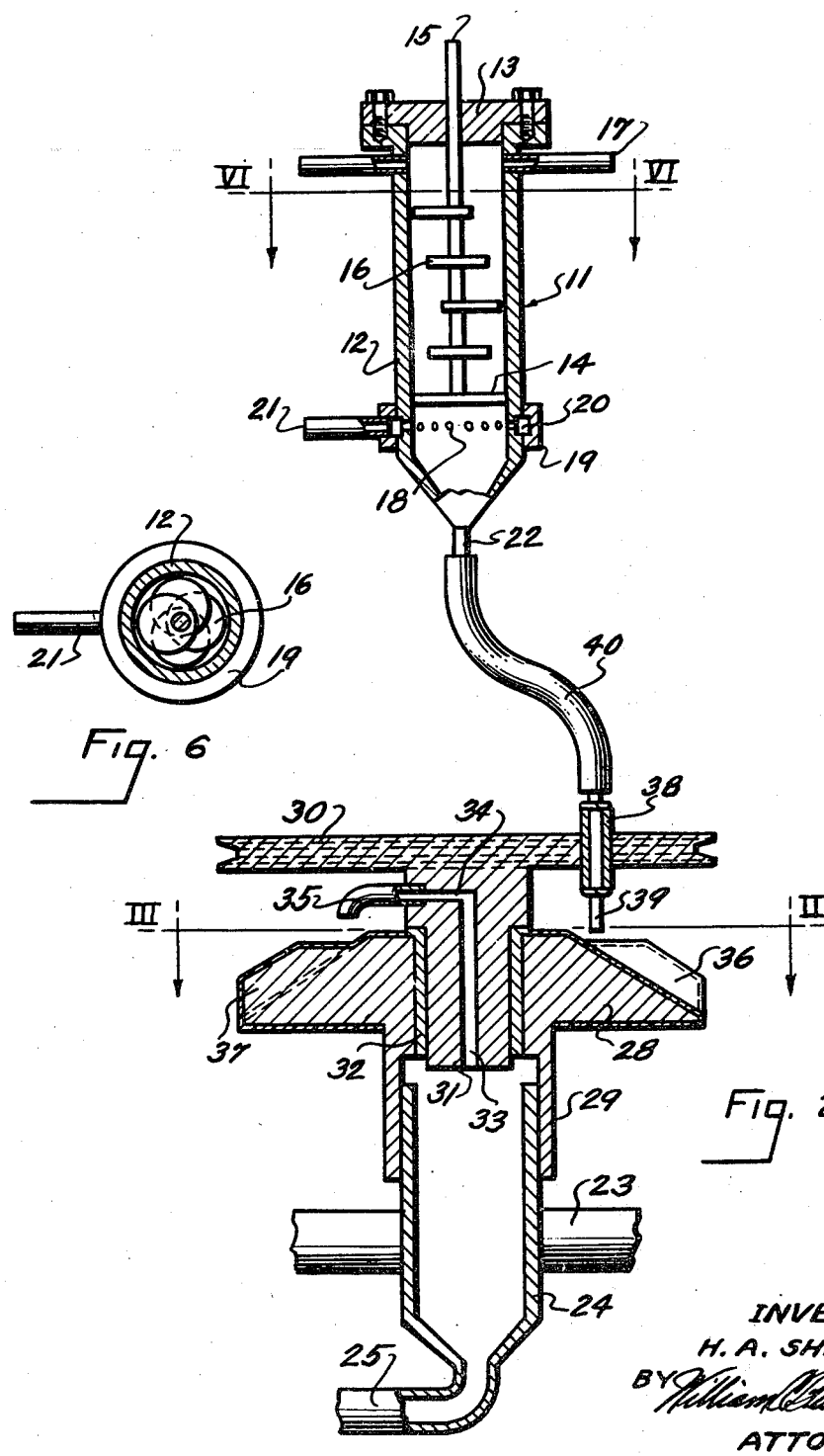
Fig. 2 is a vertical section through a preferred form of apparatus for forming hydrogel beads.

The device 6 for forming drops of liquid is shown more particularly in Fig. 2. It involves any suitable mixer 11 for preparing a solution of material which will set to a gel under the conditions prevailing in column 5. In general the solution is one which will set to a gel without any change of conditions, though it is within the scope of the present invention to prepare a solution which will not set under the conditions at which it is prepared, but which sets in the column 5, by such means as the maintenance of the liquid therein at an elevated temperature, or by maintaining an acidic liquid in the column. Thus, the drop forming liquid may be a mixture of a soluble silicate and sodium aluminate in aqueous menstruum at a sufficiently high pH that it will not set as a gel. It may be suspended in an oil solution of sulfuric or acetic acid which will then cause setting to hydrogel.

The mixing means 11, as shown, has a tubular casing 12, with a cap 13 secured to and closing the upper end thereof. Near the lower portion of the casing 12 there is secured transversely thereof a rod 14. A shaft 15 extends through the cap 13 and is rotatably mounted therein and in the rod 14. A plurality of circular mixing plates 16 are fixedly secured in spaced position and eccentrically along shaft 15 within the casing 12. The plates are in off-set relation as shown in Fig. 6. The mixer shown is provided with a pair of inlet pipes 17 at the upper end for introducing a plurality of solutions, either or both of which may be a solution of one or more materials. Preferably, and as shown, an additional inlet is provided in the lower end of the casing. In order to obtain the dissemination of such an additional material, inlet openings 18 are provided around the casing 12. A ring 19 is secured around casing 12 covering the openings 18 and providing a passage 20 communicating with all the openings 18. A pipe 21 extends through the ring 19 into the passage 20 for introducing the additional reagent into the passage 20, through the openings 18, and thus into the mixture of materials in the casing 12, which were introduced through the pipes 17. The material introduced through the pipe 21 may in general be a material which accelerates the setting of the mixed solutions to a gel. The lower end of the casing 12 converges and is provided with an outlet pipe 22.

The brackets 23 secured near the upper end of column 5 are secured to a short length of pipe 24. The lower end of pipe 24 communicates with pipe 25 which communicates in turn with the outlet of pump 26. The inlet pipe 27 of pump 26 communicates directly with the liquid in column 5, for receiving liquid from the column and introducing it into the pipe 24 through the pump 26 and pipe 25.

A plate 28 is provided which has a downwardly extending circular flange 29. This flange may be threaded for engagement with the pipe 24 or it may be permanently secured to pipe 24 as by brazing. A pulley 30 is provided with a stub shaft 31 extending axially into and rotatably mounted in plate 28 in a substantially liquid-tight bearing, such as bushing 32. The stub shaft 31 is provided with an axial bore 33 extending from the end of the stub shaft upwardly to a level above the top of plate 28. A radial passage 34 in the stub shaft extends from the upper end of bore 33 outwardly. A nozzle 35 which has a downwardly directed end is secured in the stub shaft in communication with the passage 34. Liquid pumped into the pipe 24 will then be delivered through the bore 33, passage 34, and out of the nozzle 35 onto the surface of the plate 28.

Figure 3:
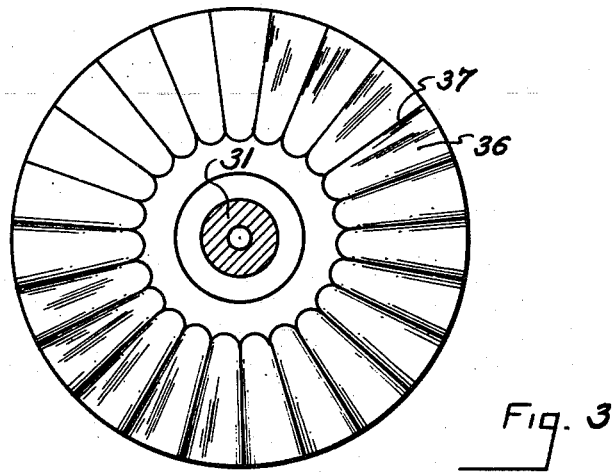
Fig. 3 is a section on the line III—III of Fig. 2.
Figure 4:
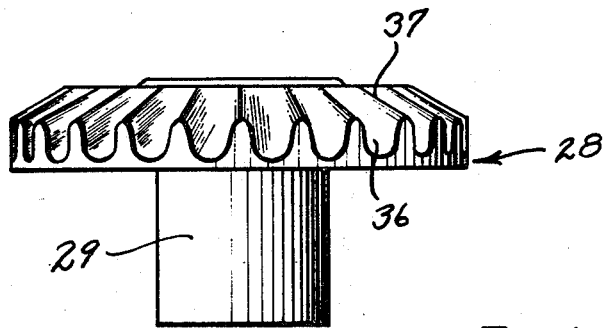
Fig. 4 is an elevation of the plate shown in Fig. 3.

As shown in Figs. 2, and 3 and 4, the plate 28 is circular with a plurality of radially extending inclined groves or flutes 36, inclined downwardly and outwardly. The dividing walls 37 between the flutes have relatively sharp edges. The flutes may have either conical walls radiating from the axis of the plate, as in a bevel gear, or the walls thereof may be cylindrical. The surface of the grooved plate 28 should be of such a material that it will not be wet by the solution introduced thereonto from the mixer 11. In general the solution from mixer 11 is an aqueous solution and accordingly the plate 28 carries a coating of a suitable water repellant material such as a hard wax, rosin, or a water repellant synthetic resin. Such a coating prevents build-up of gel upon the surface of plate 28.

A bushing 38 is secured in the pulley 30 and rotatably carries a tube 39 extending therethrough. The tube is provided with cut rings fitting in groves to prevent longitudinal movement of the tube in bushing 38. A flexible tube 40 has its ends in communication severally with the outlet 22 of mixer 11 and with the upper end of tube 39.

The upper end of the column 7 is cut away on one side to the level 41. A plate 42 is secured to the pipe at its upper edge 41 and extends as shown half-way around the pipe. The plate 42 is bent downwardly at 43. Side walls 44 are secured to the column 7 from the plate 42 upwardly. The side walls 44 have their lower edges secured to the edges of plate 42. A series of parallel spaced bars 45 are positioned between the side walls 44 and in a position inclined outwardly and downwardly from the column 7 as an extension of the plate 42. These bars 45 are positioned sufficiently closely together that beads of gel delivered to the separator 8 do not fall between the bars, but roll off the lower ends of the bars. A funnel 46 has its upper edges secured to the two side walls and to the plate 42 to receive liquid passing between the bars. The lower end of funnel 46 communicates with pipe 9 for delivering the liquid thereto.

In operation, starting with the system shut down and with the columns 5 and 7 and the pipe 9 containing liquid, the pump 10 is started. The pump is driven at a rate to raise the level of the liquid in column 5 part way up the grooves 36. Rotation of the shaft 15 is then initiated. The mixer 6 is filled with solutions introduced through the pipes 17 and the solutions are continuously fed through these pipes. A solution, such as for accelerating setting of the gel, is then introduced through pipe 21, which introduces fine streams of the solution at a multitude of points near the outlet from mixer 11. The pulley 30 is then rotated by a suitable source of power.

The concentrations and relative proportions of the solutions introduced through the pipes 17 and the pipe 21 are proportioned and the total rate of feed so adjusted as to give a setting time such that the solution will not set to a gel until the drops of gel are suspended by the quiescent body of suspending liquid in column 5. Increase in the total rate of fed effects a decrease in the time interval between mixture and suspension in the suspending liquid. Adjustment of the concentration of the solutions including in this the concentration of buffering material and other materials such as acids for adjusting the pH, control of the setting time. Such control by adjustment of these variables and adjustment of temperature is within the present skill of the art.

As the tube 39 traverses the grooves in the plate 28, equal portions of the solution are deposited in the various grooves. The portion of solution in each groove will run down the groove and coalesce as a drop resting upon the suspending liquid. After the portion of solution has coalesced, the nozzle 35 traverses the flute and delivers thereto a stream of the suspending liquid, which stream moves the coalesced drop of solution out into the body of liquid. The stream of suspending liquid also wets the flutes with a film of the liquid between each delivery of drop forming liquid to the flutes, thereby preventing chance build-up of gel in the flutes.

The size of the drops produced is controlled by the total rate of feed of liquid through the tube 39 and by the rate of rotation of pulley 30. Thus, the higher the rate of feed through the tube 39 the larger will be the drops produced. Likewise, the higher the rate of rotation of the pulley the smaller will be the drops produced.

The column 5 is sufficiently high that the drops of solution set to gel by the time they have descended to the lower end of the column. The necessary height of column will vary depending upon the setting time of the gel and upon the rate of descent of the drops through the quiescent suspending liquid. This rate of descent is controlled by the relative densities of the drops and of the suspending liquid, by the size of the drops, and by the viscosity of the suspending liquid.

The linear rate of flow of the entraining stream of suspending liquid in column 7 is greater than the rate of descent of the gel beads in the liquid, whereby the gel beads are elevated to the upper end of column 7 and discharged to the separator 8. The level 41 at the upper end of column 7 is positioned slightly below the level of plate 28. The difference in elevation is made sufficiently great that the rate of flow in column 7 to raise the level of the liquid in column 5 to the plate 28 is likewise sufficiently great to carry the drops upward in column 7.

Figure 9:
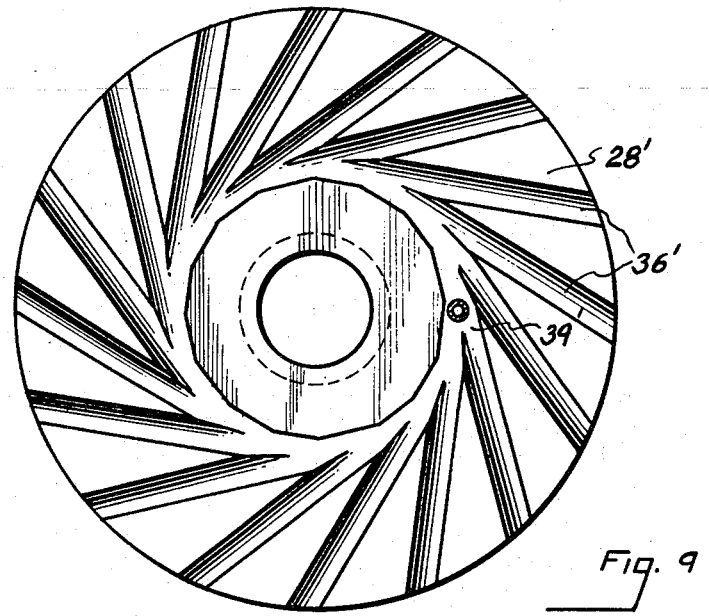
Fig. 9 is a plan of a modified form of plate for use in the bead forming head shown in Fig. 2.
Figure 10:
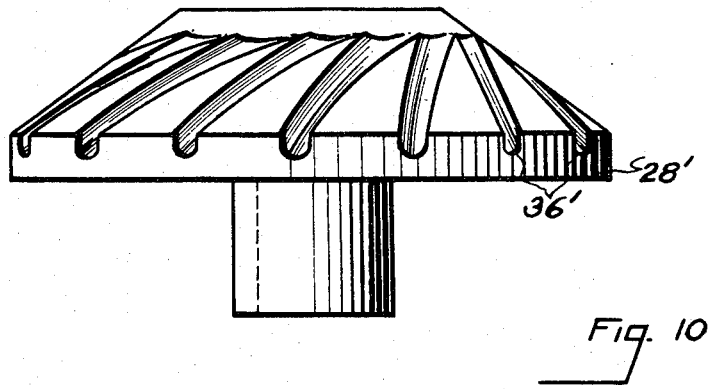
Fig. 10 is an elevation of the plate shown in Fig. 9.

An alternative form of plate 28' is shown in Figs. 9 and 10. This plate 28' is provided with grooves or flutes 36' which are inclined downwardly, and which are positioned tangentially to the path of the pipe 39. With the flutes positioned as shown in Fig. 9 the pipe 39 is rotated clockwise whereby when the rate of rotation of pipe 39 is increased to the point that centrifugal force tends to throw the solution fed through pipe 39, the direction in which it is thrown is the same as the direction in which it would normally be moving in flowing down the grooves.

Figure 7:
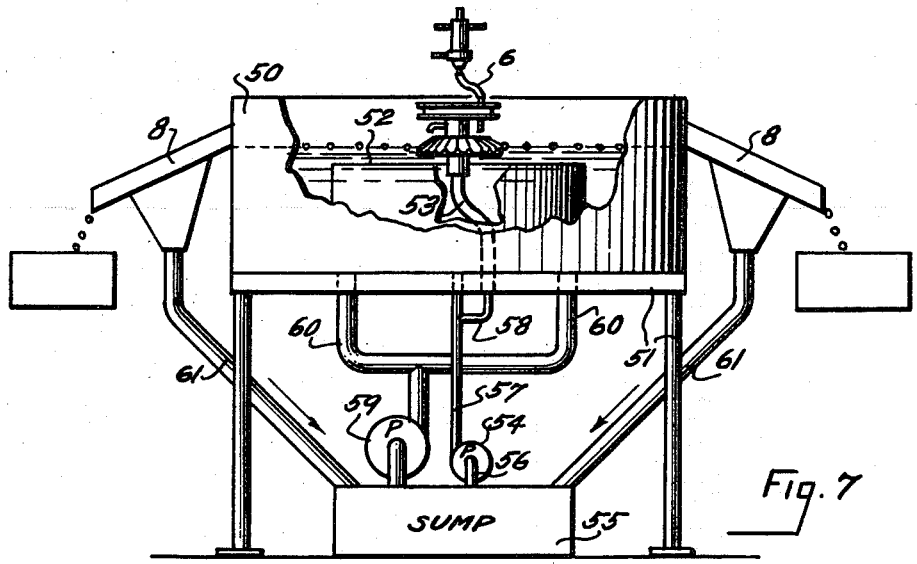
Fig. 7 is an elevation of a system in accordance with this invention in which the drops of liquid float upon the suspending liquid, parts being broken away to show internal construction.
Figure 8:
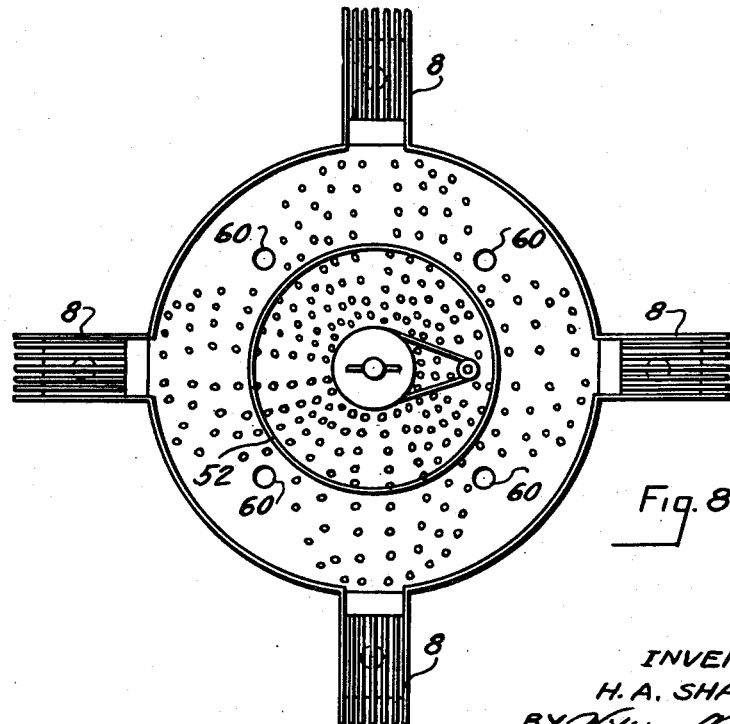
Fig. 8 is a plan of the system shown in Fig. 7.

In the modified form of this invention shown in Figs. 7 and 8 the drops of liquid are of lower density than the suspending liquid whereby the drops float upon the surface of the suspending liquid. A shallow tank 50 is supported by a suitable frame 51. The tank 50 is provided with a plurality of separators 8 as shown and described in connection with Fig. 1. A smaller tank 52 is positioned within the tank 50, the upper edge of the tank 52 being slightly below the overflow level into the separators 8. A drop forming device 6 as shown and described in connection with Fig. 1 is supported centrally of the two tanks by a pipe 53 rigidly mounted in the base of the tanks. To provide for vertical adjustment of the grooved plate 28 with respect to the liquid level in the tank 50, the plate may be screw threadedly supported upon the upper end of the pipe 53 and provided with a set screw to secure it in adjusted position. This described construction provides a central quiescent body of suspending liquid and an annular zone of suspending liquid therearound for entraining the drops in a stream of the liquid and carrying them to the separators. A pump 54 is provided to draw suspending liquid from the sump 55 by pipe 56. Pipe 57 communicates from the outlet of pump 54 to the bottom of the tank 52. A branch pipe 58 in communication with the pipe 57 introduces suspending liquid into the pipe 53 for supplying the suspending liquid to the grooved plate. A second pump 59 of substantially greater capacity is positioned to draw suspending liquid from the sump 55. A series of pipes 60 in communication with the outlet of pump 59 introduces suspending liquid into the base of the annular zone of tank 50. Return pipes 61 communicate from the separators 8 to the sump 55 to return liquid thereto.

In the operation of the form of this invention shown in Figs. 7 and 8 a suspending liquid is employed which is relatively heavy with respect to the liquid from which the drops are to be formed. Thus, when the drop forming liquid is an aqueous solution or a sol of a silicate or other inorganic or organic material, halogen substituted organic liquids are suitable, such as carbon tetrachloride.

Drop forming liquid is deposited upon the grooved plate 28 as heretofore described, and moved out of the grooves or flutes in the plate by the stream of suspending liquid. The suspending liquid in the tank 52 and immediately thereabove is substantially static. The liquid feed through pipe 57 and from the head creates a slight outward movement from the center of the tank 52 which floats the drops to the annular portion of tank 50. The liquid introduced through the pipes 60 into this annular body of liquid creates streams of liquid which entrain the drops which in the case of gel have already set as gel, and carry the hydrogel drops to one of the separators 8, wherein the suspending liquid is separated from the hydrogel and returned to the sump.

It is to be noted in this connection that when drops of suspended liquid are floated upon the surface of the suspending liquid and, while so floating, set as a gel, the gel pieces so produced, rather than being truly spherical, may be oblate spheroids. This modification in the physical form of the pieces results in substantial improvements in properties. When the gel pieces so produced are dried and employed as catalysts, the improvement, resulting from the increase in apparent surface with respect to catalyst volume in cyclic processes such as catalytic cracking wherein operation is alternately on stream for the conversion of hydrocarbons and in regeneration for the burning of coke-like deposit from the catalyst, being apparent in both stages of the cycle.

The present invention is applicable broadly to any use in which it is desired to produce uniform size drops of one liquid suspended in another. More particularly, this invention is applicable to the production of equal size drops of gel forming liquids. Thus, the present invention may be applied to the production either of organic gels in bead form such as beads of gelatin, soap, or the like.

Preferably the beads are inorganic gels, such as beads of metallic oxide or hydroxide hydrogels.

This invention is of special importance in the production of silicious gels such as silica gel which may contain one or more other oxides or hydroxides, such as alumina, zirconia, beryllia, thoria, titania, urania, vanadia, chromia, magnesium oxide, manganese oxide, lithium oxide, and the like. Furthermore, the silicious gel so produced may contain other insoluble components such as zirconium phosphate. The fluid from which the beads are made may likewise contain finely divided powders of a size less than about 50 microns, for improvement in the drying characteristics of the gel, particularly for the prevention of breakage during drying of the hydrogel to the dried gel state, as shown in copending application of Thomas H. Milliken, Ser. No. 529,594, filed April 5, 1944 (issued November 8, 1949, as U. S. Patent No. 2,487,065). The disclosed inorganic gels are of particular importance in hydrocarbon conversion processes, such as in the cracking of higher boiling hydrocarbons to gasoline, in the treating of gasoline for improvement of octane and reduction in acid heat, and in the polymerization, alkylation, and isomerization of hydrocarbon gases.

In order to prepare the pieces of hydrogel, formed in accordance with the above described process, for use as catalyst in hydrocarbon conversion processes, soluble impurities are first removed from the gel by washing with water or with an aqueous solution of an acid or acidic salt, such as ammonium chloride. In the case of silicious gels formed from sodium silicate solutions, this described purification removes the sodium from the gel. The discrete pieces of gel are then dried. If desired, the dried gel may be calcined in accordance with the processes described in the copending application of John R. Bates, Ser. No. 447,232, filed June 16, 1942 (issued May 15, 1945, as U. S. Patent No. 2,375,757) or of my copending application Ser. No. 538,711, filed June 3, 1944 (abandoned and substituted by application Serial No. 683,430, filed July 13, 1946, issued November 29, 1949, as U. S. Patent No. 2,489,334).

There is considerable latitude in the mode of application of the process hereof as above indicated. The specific types of procedures described accordingly should be taken as illustrative of and not as definitive of the range of procedures to which this invention is applicable since the specific procedure may be modified in various respects. Thus, in the manufacture of silicious gels, such as silica-alumina coprecipitated gels, the drop forming liquid may be either an acidic or a basic sol of silica and alumina, and the suspending liquid basic or acidic respectively whereby the setting time of the sol is considerably reduced. Likewise, the suspending liquid may be maintained at an elevated temperature in order to accelerate setting of the sol. In this instance, with an oil employed as the suspending liquid, increase of the temperature will decrease the viscosity. This results in an increase rate of downward movement of the drops in the liquid. While this would tend to increase the requisite depth of body of suspending liquid, this is offset by the shortened setting time resulting from the increased temperature.

It is further to be noted that the liquid introduced into the groove to move the drop forming liquid into the quiescent body of suspending liquid does not necessarily have to be of the same composition as the suspending liquid. For example, when an aqueous sol and an acidic or basic oil for accelerating setting of the sol are employed, a neutral oil may be introduced into the groove whereby to avoid the tendency of the oil so introduced to accelerate the setting of the sol. Likewise, the liquid introduced may be immiscible both with drop forming liquid and with the suspending liquid. Thus, the system may involve an aqueous sol, an oil as the suspending liquid, and mercury as the liquid for moving the sol into the oil, in which case the mercury would be collected at the bottom of the body of oil and recirculated.

While it is preferred to separate the gel pieces and the suspending liquid by producing a stream of the mixture to flow to a separator, other means may be employed such as a mechanical elevator for raising the gel pieces from a point of collection at the bottom of column 5 through a quiescent column of liquid hydrostatically balancing column 5.

Subject matter divided from the present application is claimed in subsequently filed application Serial No. 717,653 of December 21, 1946.

I claim as my invention:

1. The method of forming a plurality of substantially equal size drops of one liquid suspended by a suspending liquid immiscible with the drop forming liquid, which comprises delivering a constant stream of the drop forming liquid to a plurality of inclined grooves partially submerged in the suspending liquid, allowing the liquid introduced into each of said grooves to remain in its respective groove until it coalesces, introducing a stream of the suspending liquid into said grooves subsequently to coalescence, whereby the coalesced portions of liquid in said grooves are moved as drops out of said grooves for suspension by said suspending liquid, and traversing said streams over said grooves at constant and equal rates, whereby equal portions of drop forming liquid are delivered to each groove and whereby a constant time interval elapses from introduction of said drop forming liquid to introduction of said suspending liquid.

2. An apparatus for the formation of drops of one liquid suspended in a suspending liquid immiscible therewith, which comprises a container for holding a quiescent body of the suspending liquid, means at the surface of said body of liquid having an inclined flute extending both above and below the surface of said body of liquid, means for delivering a constant stream of the drop forming liquid toward the flute at a point upwardly along the flute from the suspending liquid, means for traversing said stream of drop forming liquid across said flute a plurality of times at a constant rate, whereby equal portions of the drop forming liquid are introduced into the flute upon each traverse, means for introducing at a point in the flute upwardly therealong from the drop forming liquid a portion of suspending liquid at a time subsequent to each introduction of the drop forming liquid, whereby the portions of drop forming liquid are individually moved from the flute out into the body of liquid after coalescence.

3. An apparatus for the production of substantially equal size drops of one liquid suspended by a suspending liquid immiscible therewith, which comprises a generally circular plate having its upper edge fluted, the flutes extending upwardly and inwardly, means mounted for rotation about the axis of said plate for delivery of a stream of drop forming liquid to the upper ends of said flutes, a second means mounted for rotation about the axis of said plate for delivery of suspending liquid to the upper portion of said flutes, said two means for the delivery streams of liquid to the upper ends of said flutes being positioned at determined angular spacing about said axis and means for rotating said two means at a substantially constant rate.

4. An apparatus substantially as defined in claim 3 in which the plate provided with flutes is coated with a water repellant material to prevent wetting of the surface thereof by an aqueous drop forming liquid.

5. An apparatus substantially as defined in claim 3 in which the flutes are angularly related to the plane of the path of the means for delivery of a stream of drop forming liquid.

6. The method of associating drops of a liquid with a body of a suspending liquid, which comprises passing individual drops of said first named liquid successively into an inclined groove for downward passage therethrough, and passing individual drops of other liquid successively into the inclined groove in such manner that, in said inclined groove, each drop of the last named liquid follows a drop of said first named liquid, said groove guiding the individual drops of liquid toward and into engagement with said suspending liquid.

7. The method of associating drops of a liquid with a body of a suspending liquid, which comprises passing individual drops of said first named liquid downwardly in succession through an inclined groove having its lower end submerged in the suspending liquid where, at the plane of submergence, each individual drop of liquid remains while it coalesces upon said suspending liquid, and passing individual drops of other liquid successively into the inclined groove in such manner that, in said inclined groove, each drop of said other liquid follows a drop of said first named liquid, said groove guiding the individual drops of liquid toward and into engagement with said suspending liquid and each drop of said other liquid moving the preceding coalesced drop from said groove.

8. The method of preparing hydrogel, which comprises introducing individual drops of a gel-forming liquid successively into an inclined groove for downward passage therethrough, passing said drops of gel-forming liquid in succession from said groove and then into a body of liquid immiscible with the gel-forming liquid whereupon the drops of gel-forming liquid set to hydrogel, and passing individual drops of other liquid successively into the inclined groove for downward passage therethrough, the individual drops of said other liquid being introduced into said inclined groove in such manner that each drop thereof follows a drop of the gel-forming liquid during passage thereof through the inclined groove.

9. The method of claim 8 wherein the drops of said other liquid are obtained from a circulating stream of the immiscible liquid.

10. The method of associating drops of gel-forming liquid with a body of a suspending liquid immiscible therewith, which comprises passing individual drops of said gel-forming liquid downwardly in succession through an inclined groove having its lower end submerged in the suspending liquid where, at the plane of submergence, each drop of gel-forming liquid remains while it coalesces upon said suspending liquid, and passing individual drops of other liquid successively into the inclined groove for downward passage therethrough, the individual drops of said other liquid being introduced into said inclined groove in such manner that each drop thereof follows a drop of the gel-forming liquid and moves the latter from said groove.

11. In apparatus of the character described, a container for a suspending liquid, means comprising a divider having generally conical configuration and defining a plurality of grooves inclined downwardly toward the surface of said suspending liquid, a conduit disposed in feeding relation with respect to said inclined grooves, means for supplying a liquid medium to said conduit, means for effecting relative rotative movement between said divider and said conduit with resultant passage of individual drops of said liquid medium in succession into each of said inclined grooves for downward passage therethrough, means passing individual drops of a second liquid medium in succession into each of said inclined grooves, said last named means being constructed and arranged so that, as regards each inclined groove, each drop of said second liquid medium follows a drop of said first liquid medium.

12. In apparatus of the character described, a container for a suspending liquid, means comprising a stationary divider having generally conical configuration and defining a plurality of grooves inclined downwardly toward the surface of said suspending liquid, a conduit disposed in feeding relation with respect to said inclined grooves, means for supplying a liquid medium to said conduit, means for rotating said conduit with respect to said stationary divider with resultant passage of individual drops of said liquid medium in succession into each of said inclined grooves for downward passage therethrough, means for passing individual drops of a second liquid medium in succession into each of said inclined grooves, said last named means being constructed and arranged so that, as regards each inclined groove, each drop of said second liquid medium follows a drop of said first liquid medium.

HUBERT A. SHABAKER.

REFERENCES CITED

The following references are of record in the file of this patent:

UNITED STATES PATENTS

| Number | Name | Date |
|---|---|---|
| 1,483,241 | Opderbeck | Feb. 12, 1924 |
| 2,238,204 | Woods | Apr. 15, 1941 |
| 2,384,455 | Daley et al. | Sept. 11, 1945 |
| 2,384,946 | Marisic | Sept. 18, 1945 |
| 2,385,217 | Marisic | Sept. 18, 1945 |
| 2,387,596 | Marisic | Oct. 23, 1945 |